United States Patent
Hammer et al.

(10) Patent No.: US 7,845,937 B2
(45) Date of Patent: Dec. 7, 2010

(54) METHOD AND DEVICE FOR INFLUENCING COMBUSTION PROCESSES

(75) Inventors: Thomas Hammer, Hemhofen (DE); Günter Lins, Erlangen (DE); Jobst Verleger, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 8 days.

(21) Appl. No.: 11/793,344

(22) PCT Filed: Dec. 19, 2005

(86) PCT No.: PCT/EP2005/056902

§ 371 (c)(1),
(2), (4) Date: Jun. 19, 2007

(87) PCT Pub. No.: WO2006/067108

PCT Pub. Date: Jun. 29, 2006

(65) Prior Publication Data

US 2008/0145802 A1 Jun. 19, 2008

(30) Foreign Application Priority Data

Dec. 20, 2004 (DE) .................. 10 2004 061 300

(51) Int. Cl.
*F23B 1/00* (2006.01)
*F23N 3/00* (2006.01)

(52) U.S. Cl. .............. 431/2; 431/18; 431/350; 73/35.08; 73/35.03; 324/76.21

(58) Field of Classification Search .......... 431/1, 431/2, 18, 11, 208; 60/793.39, 39.3
See application file for complete search history.

(56) References Cited

U.S. PATENT DOCUMENTS

| 4,111,636 A | 9/1978 | Goldberg |
| 5,049,063 A * | 9/1991 | Kishida et al. ............... 431/78 |
| 2004/0185397 A1* | 9/2004 | Branston et al. ............ 431/2 |

FOREIGN PATENT DOCUMENTS

| DE | 1 274 781 B | 8/1968 |
| DE | 12 747 81 A | 8/1968 |

(Continued)

*Primary Examiner*—Steven B McAllister
*Assistant Examiner*—Nikhil Mashruwala
(74) *Attorney, Agent, or Firm*—Harness, Dickey & Pierce, P.L.C.

(57) ABSTRACT

A specific electrode arrangement for a burner already exists with which the flame of the burner is influenced by using electrical fields, whereby these electrical fields pass through only areas of the flame in which a stabilizing and pollutant-reducing action occurs. According to at least one embodiment of the invention, the electrodes used to this end simultaneously serve both as probes for detecting flame properties as well as active field electrodes for influencing the flame properties. The probe signals can react to the voltage applied in an inertia-free manner to the electrodes without the involvement of mechanical elements. According to the associated device equipped with a burner and associated electrodes and with a power supply unit, the power supply unit furnishes a voltage that varies over time, and at least one measuring transducer exists that detects the current generated in the flame by the voltage between both electrodes and provides feedback to the power supply unit after amplification.

23 Claims, 5 Drawing Sheets

FOREIGN PATENT DOCUMENTS

| | | |
|---|---|---|
| DE | 196 32 983 C2 | 2/1998 |
| DE | 101 37 683 A1 | 2/2003 |
| DE | 101 37 683 C2 | 2/2003 |
| EP | 0 775 870 B1 | 5/1997 |
| WO | WO9601394 * | 1/1996 |
| WO | WO 03/081130 A1 | 10/2003 |

* cited by examiner

METHOD AND DEVICE FOR INFLUENCING COMBUSTION PROCESSES

PRIORITY STATEMENT

This application is the national phase under 35 U.S.C. §371 of PCT International Application No. PCT/EP2005/056902 which has an International filing date of Dec. 19, 2005, which designated the United States of America and which claims priority on German Patent Application number 10 2004 061 300.1 filed Dec. 20, 2004, the entire contents of which are hereby incorporated herein by reference.

FIELD

At least one embodiment of the present invention generally relates to a method for influencing combustion processes. In addition, at least one embodiment of the invention also relates to an associated device for performing the method.

BACKGROUND

Devices and methods for influencing combustion processes by electrical manners/elements are disclosed in numerous citations. The use of electrical manners/elements, in particular electrical fields and discharges, is aimed at improving the stability of the combustion process, reducing pollutant emissions and suppressing combustion chamber oscillations. Examples of these include WO 96/01394 A1 and DE 101 37 683 C2.

WO 96/01394 A1 describes electrode arrangements which, disposed in a combustion chamber in the area of the flame burning there, are subjected to voltages having a variable time profile and are intended to exert an influence so as to reduce the emissions of pollutant substances such as soot, carbon dioxide, unburned organic substances and nitrogen compounds.

Besides the aim of reducing pollutant emissions, the object of DE 101 37 683 C2 is also to improve the stability of the combustion and in particular to suppress thermo-acoustic emissions. The manners/elements employed to do this differ from those described in WO 96/01394 A1 in that the electrodes are fitted on that side of the combustion chamber remote from the flame.

A major advantage of influencing flames by electrical fields and discharges is that the method can be used for controlling combustion processes with no response time lag. This method requires the provision of sensors for registering the variables to be influenced.

Sensors for picking up various types of signals from flames are known in numerous embodiments. Relevant sensors in the present context are ones comprising electrodes, which are introduced into the flame or into proximity with the flame in order to measure electrical characteristics of the flame.

One example of these is given in U.S. Pat. No. 5,049,063 A, which describes an electrode extending into the flame tip, which is used to measure an ion current. An ionization electrode is also provided in DE 196 32 983 C2, which relates to a control device for a gas burner. In both documents, the signal generated by the probe is used in conjunction with suitable amplifiers and filters to advantageously control the combustion process, for example by influencing the admission of air or gas by way of a control valve. The probe itself here serves solely for the detection of flame characteristics and is itself not used for influencing the combustion process. EP 0 775 870 B1 furthermore discloses a device for damping thermo-acoustic oscillations, especially of a combustion chamber for a gas turbine with electrically influenceable combustion chamber, in which a pressure sensor installed in the combustion chamber registers pressure oscillations and generates a signal for an electrode in the combustion chamber, for the purpose of electronically controlling the flame.

A disadvantage of the conventional engineering is that the effect exerted on the combustion process is achieved via mechanical systems such as valves, which are subject to wear and have a reaction time, which may be too long, especially for controlling combustion chamber oscillations.

SUMMARY

At least one embodiment of the invention, therefore, is directed to a method to permit better influencing of the combustion process. It is also intended, in at least one embodiment, to create an associated device.

The idea of at least one embodiment of the invention may include to use electrodes which are installed in a combustion chamber for influencing the combustion by electrical fields and discharges, as provided for in DE 101 37 683 C2, for example, also for the detection of flame characteristics or to use one or more electrodes already present in a combustion chamber, which serve for the detection of flame characteristics, as electrodes for generating an electrical field or an electrical gas discharge, which influence the combustion in the manner described above.

It is of decisive significance here that the electrodes simultaneously serve both as probes for the detection of flame characteristics and as active field electrodes for influencing the flame characteristics, and the probe signals generated by means of these electrodes have a feedback effect, without any response time lag, on the voltage present on the electrodes, in order to control the combustion without the involvement of mechanical elements. Separate probes for registering signals are not needed.

At least one embodiment of the invention has applications in various spheres. One particular application possible in the industrial sphere is in gas turbines, but burners used in process engineering are also a feasible application. Given the high thermal stresses occurring there a single wall bushing proves especially advantageous. In addition, at least one embodiment of the invention can also advantageously be applied in the domestic services sphere for heating and water-heating, where it is a question of reducing costs. Whereas in industrial use the reduction of pollutant emissions is of particular importance, in the domestic services sphere the utilization of fuel and the reduction of odors are of primary concern.

With at least one embodiment of the invention there are no limitations of any kind with regard to the type of fuel (natural gas, synthesis gas, oil), fuel-air mixtures (lean, stoichiometric, or rich) and/or number and type of controlled flames (diffusion flames, partially premixed flames, premixed flames) in the burner.

At least one embodiment of the invention relies on the fact that an electrical field in a flame gives rise to a charge-carrier transfer, which produces an electrical current between the field-generating electrodes. Both for the probe measurement and for the electrical control, the strength, time profile and frequency of the electrical current depend on the impressed voltage, on the one hand, and the characteristics of the flame, especially its conductivity and its spatial distribution, on the other. The correlation between the voltage present on the electrodes and the strength of the current produced thereby can be illustrated by a current-voltage characteristic curve, which will hereinafter also be referred to as a probe characteristic curve and will be described in detail below.

At least one embodiment of the invention involves the application of a voltage varying over time for controlling the combustion, the current varying over time which this produces being used directly for diagnosis of the combustion process. It furthermore entails the impressing of a periodic probe voltage on the control voltage, the basic frequency of the probe voltage being high compared to typical signal frequencies of the control voltage, and separation of the probe current from the control current on the basis of a frequency-dividing network. In an especially advantageous embodiment, the invention involves the use of amplitude-modulated, high-frequency voltages for control and analysis, the diode-like characteristic curve, i.e. the asymmetry of the behavior in respect of positive and negative polarity, being utilized by electrode systems in flames.

At least one embodiment of the invention further involves the use of multi-electrode systems, which are supplied from one common controlled voltage source, or from controlled voltage sources, each associated with one or more electrodes. The advantages of a multi-electrode system lie, in particular, in the fact that spatially resolved measurements are possible and the combustion can be controlled over an extended load range with a greatly varying spatial structure.

At least one embodiment of the invention further relates to combinations of systems, in which at least one electrode acts both as field electrode and measuring electrode according to the idea of at least one embodiment of the invention outlined above and at least one further electrode is used exclusively as measuring electrode or field electrode.

Finally at least one embodiment of the invention extends especially to a combination as specified in the preceding paragraph, in which one or more electrodes temporarily act exclusively as measuring electrode or as field electrode.

BRIEF DESCRIPTION OF THE DRAWINGS

Further details and advantages of the invention are set forth in the following description of the drawings of example embodiments, referring to the drawing in conjunction with the patent claims. In the drawings:

DETAILED DESCRIPTION OF THE EXAMPLE EMBODIMENTS

Figure 1:
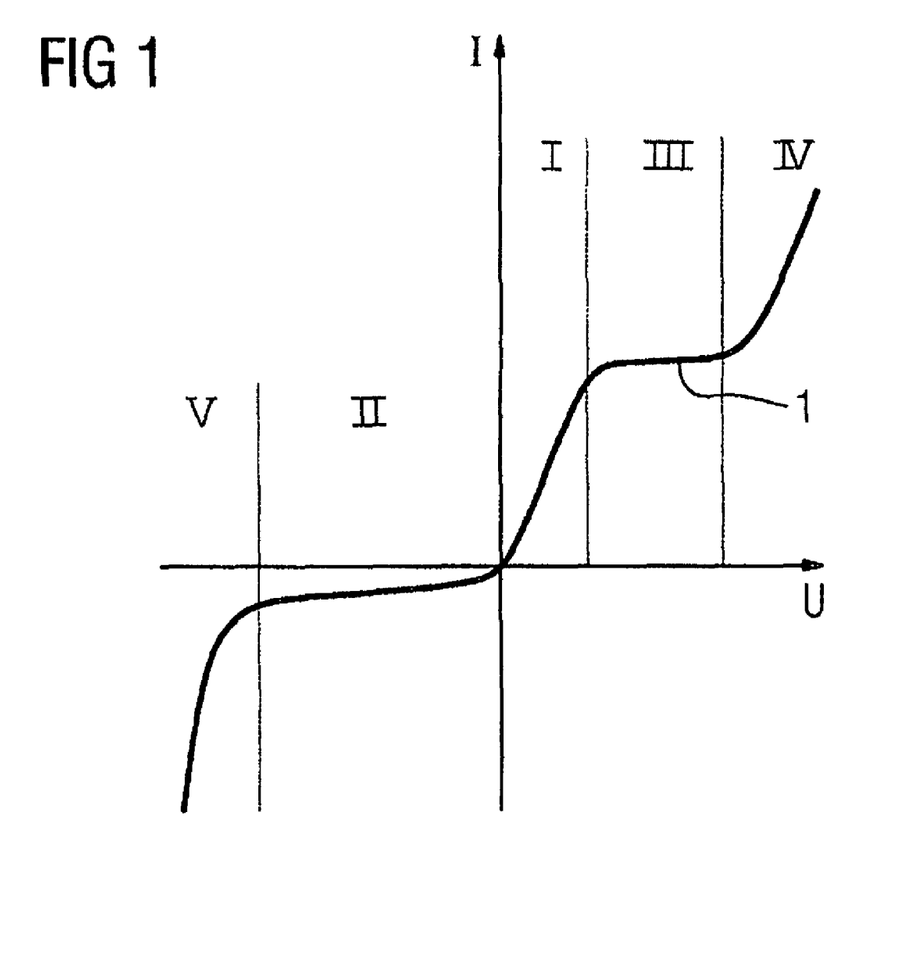
FIG. 1 shows the characteristic curve already mentioned.

FIG. 1 shows an example of a probe characteristic curve 1. The application of small voltages of positive polarity produces a current strength increasing steadily in proportion to the voltage. In the area I, this results in a linear section of the characteristic curve 1, in which the drift of the ions and electrons formed in the combustion reaction zone induces a current flow in the high-voltage electrode. As the voltage continues to rise, the charge separation forms space-charge layers, which above a certain voltage limit the current strength to the saturation current, which varies as a function of the ionization rate in the combustion reaction zone. The area characterized by this is denoted as the saturation area III. This is followed again, in the area IV, by a rise in the probe characteristic curve 1.

Voltages of negative polarity give rise to significantly smaller probe currents than with a positive polarity, and owing to the high electron mobility the signal progresses much more rapidly to saturation, so that the linear area and the saturation area do not appear distinctly separated from one another. The area II therefore includes the linear part and the saturation area of the probe characteristic curve 1 for negative polarity.

The saturation area III for positive polarity has already been defined. With a further increase in the voltage the electrical field strengths become so high that electron multiplication occurs through ionization pulses. The ensuing characteristic curve sections in the area IV already mentioned are marked by independent gas discharge effects. The same applies analogously to the negative polarity in the area V.

Depending on the pressure, temperature, gas composition and placing of the electrodes, the probe characteristic curve 1 may deviate significantly from the example shown here, resulting in different characteristic curves. In particular, the saturation area II, for example, may be absent because inhomogeneous electrical fields mean that gas discharge effects already occur at voltages lower than the saturation voltage.

Figure 2:
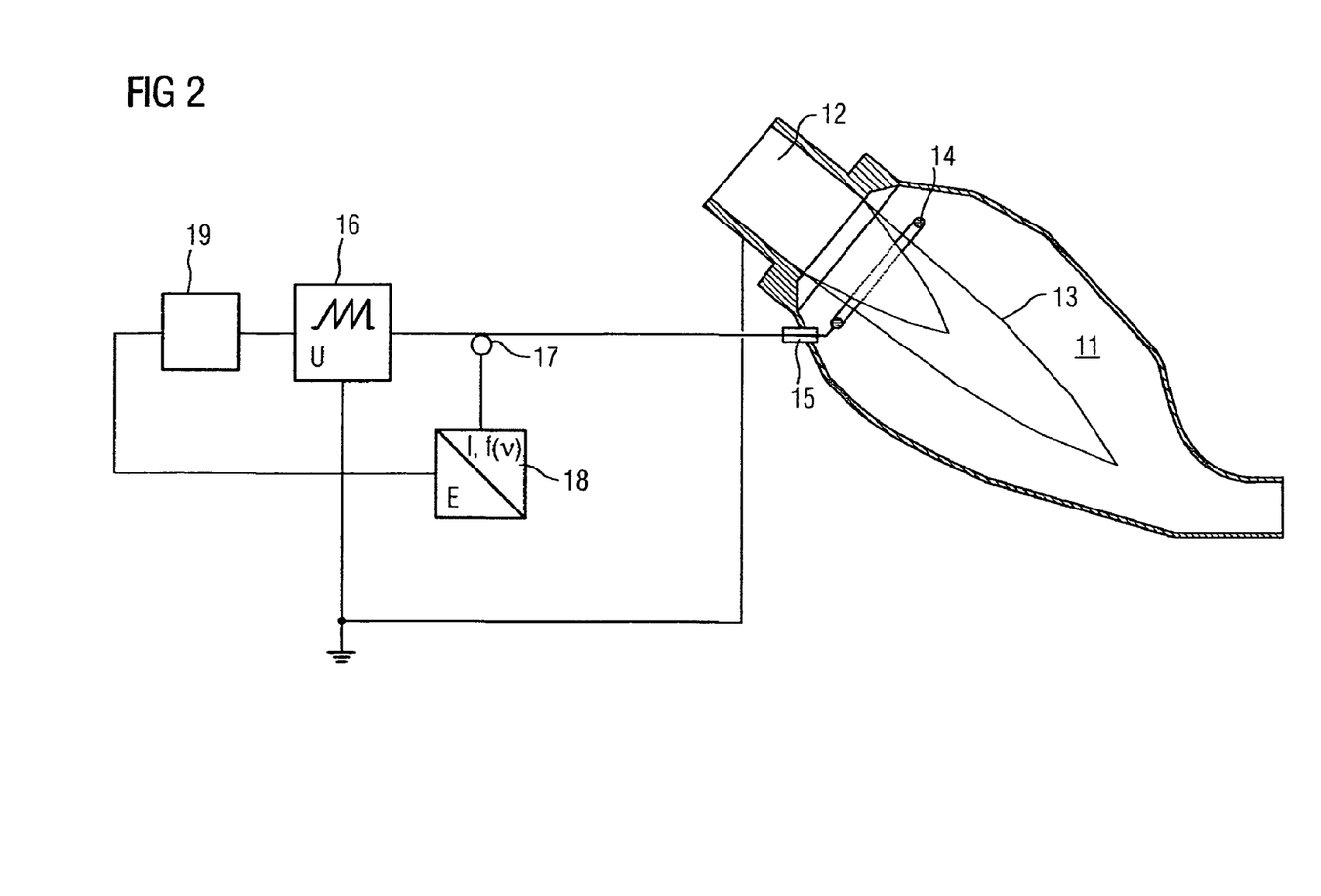
FIG. 2 and FIG. 3 show a schematic representation of two alternatives for a turbine-like burner with associated means for diagnosis and influencing of the combustion in process.

The example embodiment in FIG. 2 represents a burner 12 intended to be electrically conductive, which is arranged in a combustion chamber 11 and in which a flame 13 burns. Arranged in the area of the flame is an annular electrode 14, which encloses the flame 13 and which by way of a bushing 15 through the combustion chamber wall is connected to a voltage supply unit 16, in such a way that the voltage U(t), variable over time and supplied by the unit 16, prevails between the electrode 14 and the burner 12, the voltage selected in this example being a saw-tooth voltage. A sensor 17 detects the current generated by the voltage between the burner 12 and the electrode 14 in the flame, thereby registering the current strength I and the frequency spectrum f(v).

In a measuring transducer 18, which may be replaced by a control computer, the registered variables I and f(v) are converted into an electrical signal E, which with the aid of the control unit 19 is used in the voltage supply unit 16 to regulate the voltage in respect of the amplitude, pulse shape and frequency. Should the measured current strength deviate from the set range varying as a function of the operating conditions of the burner 12, or if current fluctuations should occur in an undesirable frequency range, the amplitude, pulse shape and frequency of the voltage U(t) and its phase in relation to the measuring signal are adjusted so that the characteristics measured at the electrodes again lie within the set range.

The example described with reference to FIG. 2 includes the use of probe signals generated by the field electrodes to control mechanical elements, especially valves. This is illustrated in the exemplary embodiment in FIG. 3, which in addition to the elements in FIG. 2 has a further sensor 17', a further measuring transducer 18', a further control unit 19' and a control valve 20, which serves to adjust the air supply to the burner 12, for example. The control signal for the valve 20 can also be derived from the first measuring transducer 18, as is indicated by a dashed line in FIG. 3.

Figure 3:
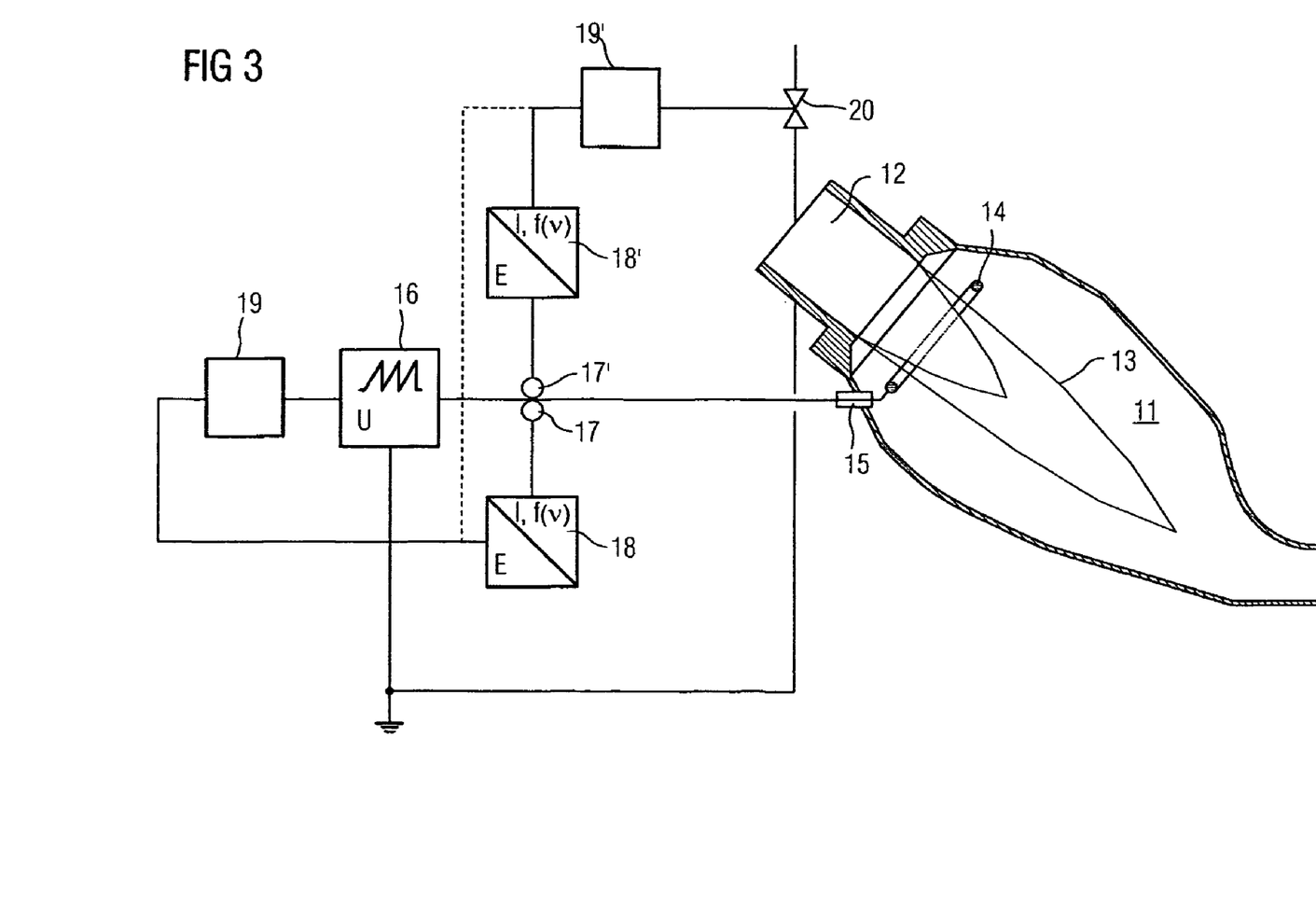

If the measuring transducer 18 is replaced by a control computer, this is used in combination with the electrode system to determine a section of the current-voltage characteristic curve 1 for the flame under the currently prevailing conditions, to compare this with a set-characteristic curve filed in the memory of a computer, not described in detail here, and if necessary to modify the conditions so that the actual characteristic curve approximates to the set characteristic curve and is largely identical to this.

The underlying principle of the characteristic curve measurement will be illustrated with reference to FIG. 4, which in a simplified representation shows only one linear area L and one non-linear area NL of the current-voltage characteristic curve 1 for a flame. Between the electrodes a control voltage $U_0$ is applied, on which a further, periodically varying probe voltage, here represented for example as a sinusoidal voltage ($U_1=U_{10}\cdot\sin \omega t$), is superimposed, giving the equation (1):

$$U(t)=U_0+U_{10}\cdot\sin(\omega t) \quad (1)$$

Figure 4:
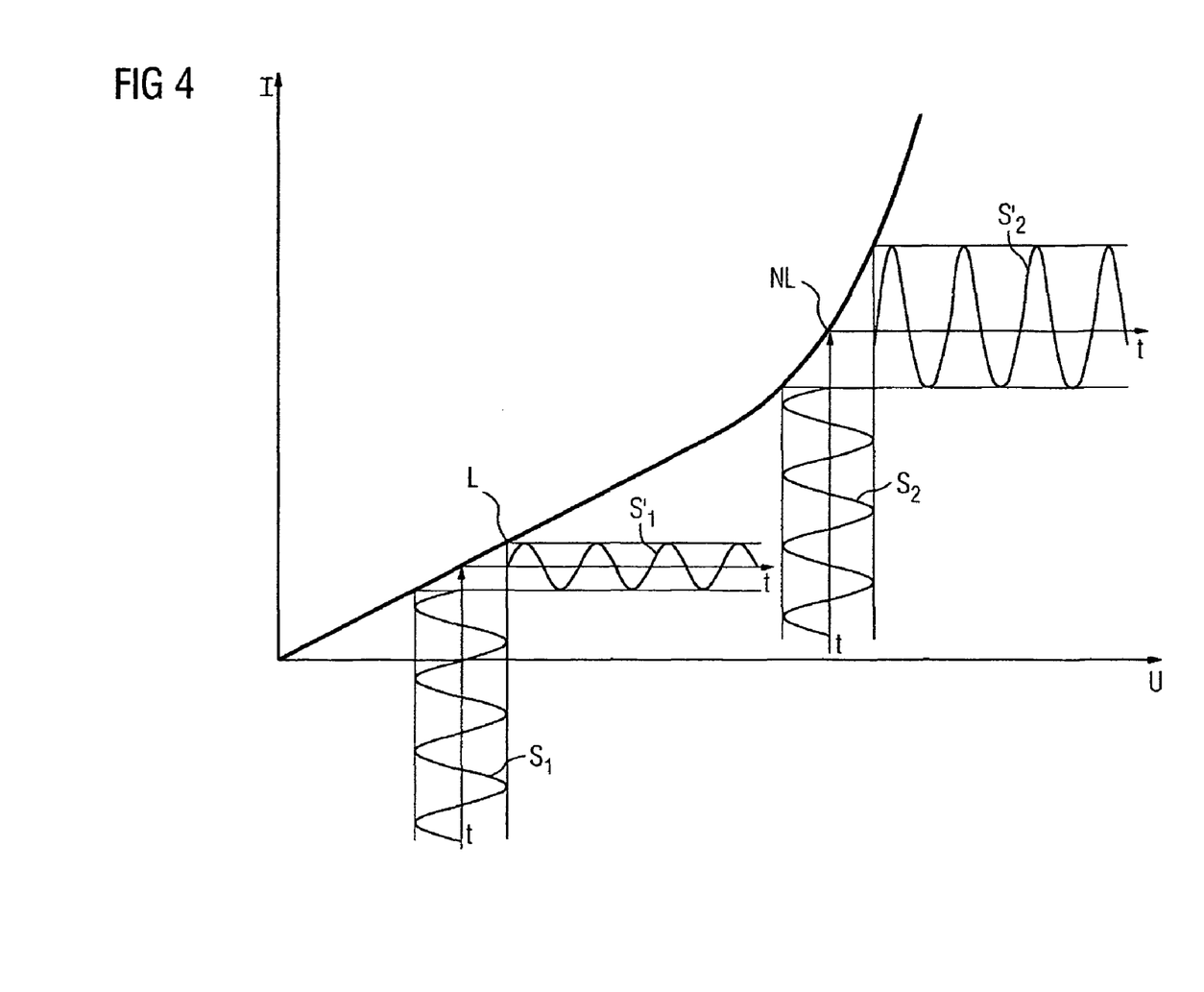
FIG. 4 shows a current-voltage characteristic curve.

If the total voltage U(t) lies in the linear area of the characteristic curve, this eventuality being represented by the signal $S_1$ in FIG. 4, a current is produced according to the signal $S'_1$, the current being proportional to the voltage signal $S_1$. Here the amplitude of $S_1$ is a measure of the steepness of the characteristic curve. If the total voltage lies in the non-linear area of the characteristic curve (signal $S_2$), the current signal $S'_2$ is distorted in comparison to the voltage signal $S_2$, the distortion, quantifiable by Fourier analysis, for example, being a measure of the curvature of the characteristic curve.

The substitute circuit diagram for the combination of flame and electrode system, not shown in detail here, also contains a capacitive component in addition to a resistive component. Owing to this, a phase shift $\Delta\psi$, which is likewise detected and evaluated for the purpose of flame control, occurs between the signals $S_1$ and $S'_1$ and between the signals $S_2$ and $S'_2$.

Figure 5:
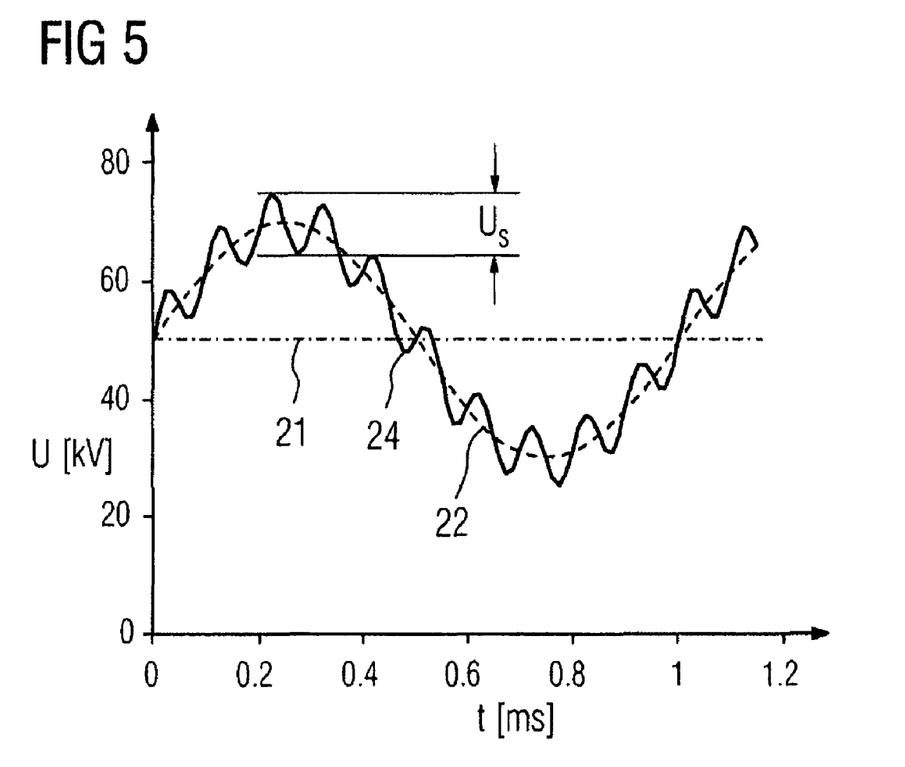
FIG. 5 shows the time curve of the voltage for control purposes.

FIG. 5 represents a further example of the time curve for a voltage for controlling and "probing" a combustion process, which loads a high-voltage electrode compared to electrical ground. If a burner is operated with fuel-air ratios or mass flows outside its optimum range, a dc voltage 21 may be applied in order to permanently reduce the pollutant emissions and to stabilize the combustion. In order to suppress combustion oscillations, ac voltages with frequencies in the 1 Hz to 10 kHz range may be superimposed on the dc voltage 21, so that the control voltage 22 comprises an offset ac voltage. For a rapid diagnosis of changes of state, a periodic probe voltage $U_s(t)$, having a high frequency and a low amplitude compared to the control voltage, is impressed upon the control voltage.

This results in an electrode voltage 24, which for control purposes comprises a dc voltage component and an ac voltage component, and for the combustion diagnostics an ac voltage component in a frequency range which is not needed for control purposes. Measuring signals can therefore be separated from control signals by simple electronic means, such as, in particular, band pass filters or other arrangements of chokes, resistors and capacitors. A simple potential separation is furthermore possible through capacitive coupling of measuring transducers.

In addition to the examples described above, there are other feasible examples of a use of voltages covering the entire voltage range relevant to the characteristic curve of a flame shown in FIG. 1. With the diode-like characteristic curve 1 in FIG. 1, it is also possible to use high-frequency ac voltages in order to obtain a unipolar current at the periodic mean.

The general idea of at least one embodiment of the invention set forth in the individual examples is not limited, however, to the toroidal, annular electrodes coaxial with the burner, which are merely described by way of example in FIGS. 2 and 3. Further embodiments instead comprise cylindrical annular electrodes, needle electrodes, ball electrodes and bar electrodes, and combinations of these forms, it being possible to coat the electrodes in all embodiments with a non-conductive, dielectrically active material or a resistive current-limiting, especially ion-conducting, ceramic material.

It will be appreciated that with an electrically insulating sheathing of the electrodes, the control voltage has to be impressed as ac voltage or pulse voltage. Reference is made, in particular, to DE 101 37 683 C2, cited at the outset, with regard to this.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for influencing combustion processes, the method comprising:
   exposing at least one flame to an effect of an electrical field by applying a voltage to at least one electrode;
   simultaneously using the electrode both as a probe for the detection of flame characteristics and as an active field electrode for influencing the flame characteristics;
   controlling the combustion processes without the involvement of mechanical elements using signals generated from the probe, the probe signals having a feedback effect on the voltage present on the at least one electrode; and
   using the electrical current between a burner and the at least one electrode, produced by a charge transfer in the flame, to generate an electrical signal.

2. The method as claimed in claim 1, wherein an amplitude, time profile and frequency of the probe signal are used for controlling a voltage supply of the field-generating electrodes.

3. The method as claimed in claim 1, wherein a dc voltage with superimposed ac voltage is used as a control voltage applied to the at least one electrode.

4. The method as claimed in claim 3, wherein a periodic probe voltage having a high frequency and a low amplitude compared to the control voltage is impressed upon the control voltage.

5. A method, comprising:
   using the method as claimed in claim 1 in a gas turbine.

6. A method, comprising:
   using the method as claimed in claim 1 in an industrial burner.

7. A method, comprising:
   using the method as claimed in claim 1 in a domestic burner.

8. A device for performing the method as claimed in claim 1, comprising:
   a burner housed in a combustion chamber;
   at least one electrode assigned to the burner, the burner being of metallic material and constituting a first electrode, with a second electrode being provided together with a voltage supply unit; and
   a control unit operatively connected to the burner and the second electrode, the control unit being configured to use signals from the second electrode both as a probe for the detection of flame characteristics and as active field electrodes for influencing the flame characteristics wherein
   the voltage supply unit is usable to deliver a voltage varying over time and wherein at least one sensor is provided, to register a current generated by the voltage between the two electrodes in a flame of the burner.

9. The device as claimed in claim 8, further comprising means for registering and evaluating a frequency spectrum of a signal received from the at least one sensor.

10. The device as claimed in claim 8, further comprising a measuring transducer for converting measured variables into an electrical signal, which is fed back to the voltage supply unit.

11. The device as claimed in claim 8, wherein the control unit is a control computer connected to the burner to provide control of the combustion processes.

12. The device as claimed in claim 8, wherein stored characteristic curves are used as control variables for controlling the voltage supply unit, which are stored in at least one of the control unit and a computer memory.

13. The device as claimed in claim 8, further comprising means for the superimposition of dc and ac voltage for generating the control voltage and probe voltage on the electrodes.

14. The device as claimed in claim 13, further comprising means for separating the control voltage, wherein the probe signals are assigned to the at least one sensor.

15. The device as claimed in claim 8, wherein mechanical actuators for the burner are activated by a control signal generated from the at least one sensor.

16. The device as claimed in claim 8, wherein the control signal actuates a valve connected to the burner for controlling the combustion processes.

17. The device as claimed in claim 8, wherein at least the second electrode is sheathed in ceramic material.

18. The device as claimed in claim 8, wherein the burner is enclosed by a shield of ion-conducting material, a through-bushing being in a wall of the shield to connect the voltage supply to the second electrode.

19. The method as claimed in claim 2, wherein a Fourier analysis of the probe signal is performed for evaluating a frequency of the probe signal.

20. The device as claimed in claim 8, wherein at least one control unit is provided for regulating the voltage in respect of at least one of the amplitude, pulse shape and frequency of the current.

21. The method as claimed in claim 1, further comprising impressing a periodic probe voltage on the control voltage, wherein a basic frequency of the probe voltage is higher than a typical signal frequency of the control voltage.

22. The method as claimed in claim 1, wherein the feedback effect of the probe signals on the voltage present on the at least one electrode is without inertia.

23. The method as claimed in claim 1, wherein the feedback effect of the probe signals on the voltage present on the at least one electrode reduces the response time of controlling the combustion process.

* * * * *